(12) United States Patent
Kim et al.

(10) Patent No.: US 8,660,726 B2
(45) Date of Patent: Feb. 25, 2014

(54) TORQUE BLENDING SYSTEMS FOR HYBRID ELECTRIC VEHICLES WITH ELECTRICALLY CONTINUOUS VARIABLE TRANSMISSIONS

(75) Inventors: Min-Joong Kim, Bloomfield Hills, MI (US); Alan G. Holmes, Clarkston, MI (US); Brendan M. Conlon, Rochester Hills, MI (US)

(73) Assignee: GM Global Technology Operations LLC

( * ) Notice: Subject to any disclaimer, the term of this patent is extended or adjusted under 35 U.S.C. 154(b) by 382 days.

(21) Appl. No.: 12/822,603

(22) Filed: Jun. 24, 2010

(65) Prior Publication Data

US 2011/0320075 A1    Dec. 29, 2011

(51) Int. Cl.
*B60L 11/04* (2006.01)
*B60W 10/08* (2006.01)

(52) U.S. Cl.
USPC ........................................ 701/22; 180/65.285

(58) Field of Classification Search
USPC ................. 701/22; 180/65.21, 54.23, 65.275, 180/65.28, 65.285
See application file for complete search history.

(56) References Cited

U.S. PATENT DOCUMENTS

| | | | |
|---|---|---|---|
| 5,818,116 A * | 10/1998 | Nakae et al. | 290/38 R |
| 6,552,507 B2 | 4/2003 | Miyazawa | |
| 7,023,150 B2 | 4/2006 | Hisada et al. | |
| 7,117,071 B2 * | 10/2006 | Aoki et al. | 701/22 |
| 7,264,570 B2 * | 9/2007 | Heap et al. | 477/3 |
| 7,315,774 B2 | 1/2008 | Morris | |
| 7,677,341 B2 * | 3/2010 | Tomo | 180/65.265 |
| 7,680,567 B2 | 3/2010 | Syed et al. | |
| 2008/0045382 A1 * | 2/2008 | Kawasaki et al. | 477/115 |
| 2008/0099259 A1 | 5/2008 | Tomo | |
| 2009/0145673 A1 | 6/2009 | Soliman et al. | |
| 2011/0125390 A1 * | 5/2011 | Bellinger et al. | 701/104 |

FOREIGN PATENT DOCUMENTS

DE        69608485        11/2000

OTHER PUBLICATIONS

U.S. Appl. No. 12/689,262, Karl Andrew Sime et al., filed Jan. 19, 2010.

* cited by examiner

*Primary Examiner* — Fadey Jabr
*Assistant Examiner* — Aaron L Troost

(57) ABSTRACT

A hybrid control system for a hybrid electric vehicle (HEV) includes a hybrid control module. The hybrid control module includes a first motor control module that controls output torque of a first motor. A second motor control module controls output torque of a second motor based on a second motor torque request signal. The second motor torque request signal is generated based on a transmission output torque request signal prior to startup of an engine of the HEV. An override module generates a torque override request signal during the startup. The first motor control module controls output torque of the first motor to crank the engine during the startup. The second motor control module adjusts output torque of the second motor based on the torque override request signal and not the transmission output torque request signal during the startup to minimize vehicle jerk during the engine start.

21 Claims, 8 Drawing Sheets

TORQUE BLENDING SYSTEMS FOR HYBRID ELECTRIC VEHICLES WITH ELECTRICALLY CONTINUOUS VARIABLE TRANSMISSIONS

FIELD

The present disclosure relates to torque control systems for hybrid electric vehicles with electrically continuous variable transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A hybrid electric vehicle (HEV) may include a powertrain system with multiple electric motor and/or generator units (MGUs) and an internal combustion engine (ICE). The MGUs and the ICE are used to provide torque to an electrically continuous variable transmission (EVT). The HEV may operate in an electric vehicle (EV) mode or in a hybrid mode.

The EV mode is used to conserve fuel. The engine is stopped (e.g., crankshaft of ICE stopped or rotating at approximately 0 revolutions-per-minute (rpm) and ignition disabled) when in the EV mode. Vehicle propulsion torque is provided by one or more of the MGUs when in the EV mode. A control module may switch from the EV mode to the hybrid mode when an increased torque output request (e.g., vehicle operator "tip-in" on an accelerator pedal) is received and/or due to a depleted state of charge (SOC) of an energy storage system. A "tip-in" event may refer to when an accelerator pedal is actuated by a vehicle operator and/or when the accelerator pedal is actuated past a predetermined pedal position. The control system may switch to the hybrid mode, for example, when battery SOC level is less than a predetermined threshold.

The hybrid mode is used, for example, when power storage levels of a battery pack are less than a predetermined threshold. The engine is running (e.g., operating at a speed greater than 0 rpm and ignition is enabled) and vehicle propulsion torque is provided by a combination of torque from the engine and one or more of the MGUs when in the hybrid mode.

Incorporation of multiple MGUs and an EVT allows for variable adjustment in engine speed. This provides engine speed adjustment at a certain vehicle speed for improved fuel economy. A HEV can experience large levels of changes in vehicle acceleration ("vehicle jerks") when switching operating modes from, for example, the EV mode to the hybrid mode. The vehicle jerks due to the engine start may have an oscillatory signal profile due to pumping forces including compression forces within the ICE.

SUMMARY

A hybrid control system for a hybrid electric vehicle (HEV) is provided and includes a hybrid control module. The hybrid control module includes a first motor control module that controls output torque of a first motor. A second motor control module controls output torque of a second motor based on a second motor torque request signal. The second motor torque request signal is generated based on a transmission output torque request signal prior to startup of an engine of the HEV. An override module generates a torque override request signal during the startup. The first motor control module controls output torque of the first motor to crank the engine during the startup. The second motor control module adjusts output torque of the second motor based on the torque override request signal and not the transmission output torque request signal during the startup.

In other features, a hybrid control system for a HEV is provided and includes a hybrid control module. The hybrid control module includes a first motor control module that controls output torque of a first motor. A second motor control module controls output torque of a second motor based on a second motor torque request signal. The second motor torque request signal is generated based on a transmission output torque request signal prior to startup of an engine of the HEV. An override module generates a torque override request signal during the startup. A torque control module adjusts the transmission output torque request signal based on the torque override signal. The first motor control module controls output torque of the first motor to crank the engine during the startup. The second motor control module adjusts output torque of the second motor based on the adjusted transmission output torque request signal during the startup.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
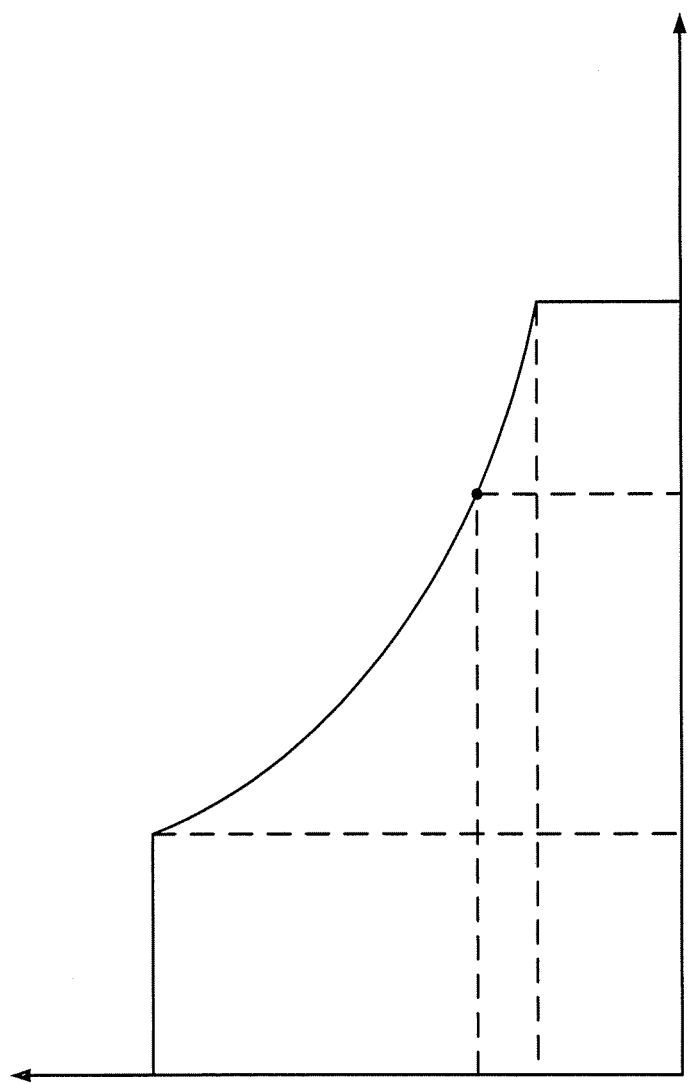
FIG. 1 is an exemplary graph of output torque versus speed for an electric motor and/or generator unit (MGU) of a hybrid electric vehicle (HEV)

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke of a cylinder. The four-strokes are repeated during operation of the engine.

In addition, although the following embodiments are described primarily with respect to example internal combustion engines, the embodiments of the present disclosure may apply to other internal combustion engines. For example, the present invention may apply to compression ignition, spark ignition, homogeneous spark ignition, homogeneous charge compression ignition, stratified spark ignition, diesel, and spark assisted compression ignition engines.

In FIG. 1, an exemplary graph of output torque versus speed for an electric motor and/or generator unit (MGU, which may be referred to as an electric motor and/or generator device (MGD)) of a hybrid electric vehicle (HEV) is shown. A MGU may be referred to as a motor generator unit or MGU. A MGU has a corresponding torque output versus shaft speed relationship. A maximum output torque $T_{MAX}$ (e.g., 250 Newton meters (Nm)) may be provided when the shaft speed is less than a speed threshold (e.g., $RPM_1$). As the shaft speed of the MGU increases the maximum or torque output limit of the MGU decreases to a torque output limit ($T_{LIMRPMMAX}$) (e.g., 50 Nm) associated with a maximum shaft speed $RPM_{MAX}$ (e.g., 12,000 rpm).

As an example, the MGU may be operated at a shaft speed $RPM_2$ (e.g., 10,000 rpm) when a vehicle is at a high vehicle speed (e.g., 80 miles-per-hour (mph)). A torque output limit of MGB at the shaft speed $RPM_2$ is $T_{LIMRPM2}$ (e.g., 75 Nm). For this reason, the output torque of a MGB is based on the operating speed of MGB.

Motor Torque Reserve Mode

A HEV may operate in an electric vehicle (EV) mode or a hybrid mode. During the EV mode, an engine of the HEV is stopped, ignition of the engine is disabled, and vehicle propulsion torque is provided by one or more of MGUs. During the hybrid mode, the engine is running, ignition of the engine is enabled, and vehicle propulsion torque is provided by a combination of torque from the engine and one or more of the MGUs.

The HEV may provide a motor torque reserve and operate in the EV mode when the HEV is at a vehicle speed that is less than a predetermined speed threshold (e.g., 20 mph) to minimize jerk. The HEV may be operated in the hybrid mode at speeds greater than the predetermined speed threshold. A MGU of the HEV may provide a torque output that does not exceed a predetermined torque threshold that is less than a torque output limit of the MGU to provide the motor torque reserve. As an example, the MGU may be operated to provide up to 100 Nm when the output torque limit for a current motor speed is 150 Nm. The reserved motor torque of 50 Nm here may be used when the engine is cranked and torque disturbance rejection control is provided as a result. Torque output of the MGU may be adjusted between the predetermined torque threshold and the torque output limit when the engine is cranked to compensate for the pumping forces.

Although this increased motor torque reserve may decrease vehicle jerk due to engine start during the transition from the EV mode to the hybrid mode, it will also decrease maximum vehicle speed and torque limit of the EV mode. This negatively affects fuel economy of the HEV.

Maximum Motor Torque Mode (Maximum EV Operation Mode)

A HEV may be operated in the EV mode when a vehicle is at higher speeds (e.g., speeds greater than 20 mph). For example, a MGU may be at maximum torque output levels to allow for increased vehicle speed operation. As an example, a MGU may provide a torque output at or near a maximum torque output (e.g., approximately 90-100 Nm) to allow vehicle speed to increase to a high vehicle speed (e.g., 80 mph). Although this allows for increased EV mode operation, this peak output torque operation of a MGU can limit removal of vehicle jerk during engine startup. As the MGU is operating at peak torque output levels, torque output of the MGU can not be increased to compensate for decreases in engine output torque during engine startup.

Figure 2:
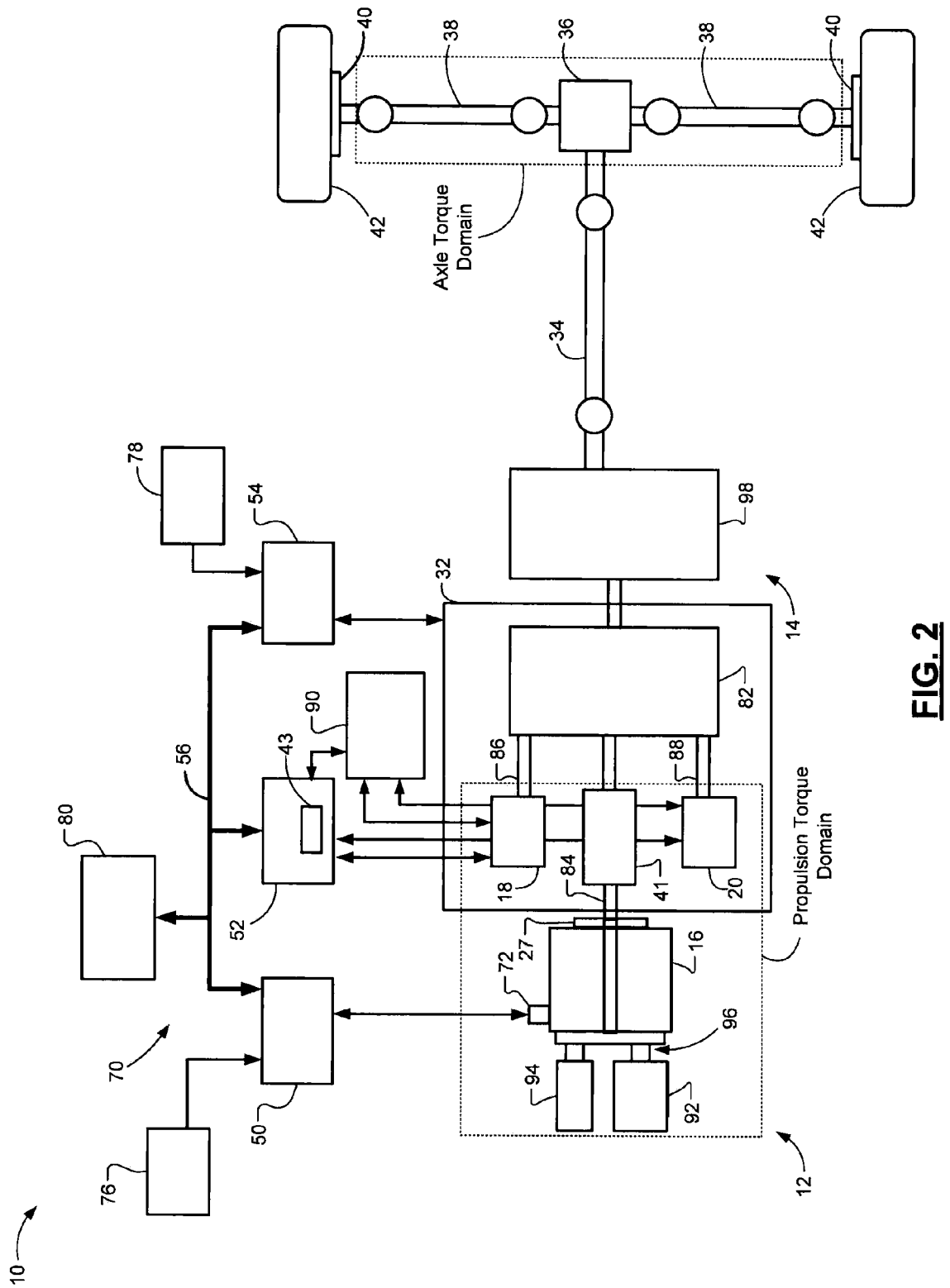
FIG. 2 is a functional block diagram of a hybrid powertrain system incorporating a torque control module in accordance with the present disclosure.

In FIG. 2, a functional block diagram of a hybrid powertrain system 10 of a HEV that operates in an EV mode and in a hybrid mode is shown. The hybrid powertrain system 10 includes a propulsion system 12 and a drivetrain system 14. The propulsion system 12 includes an internal combustion engine (ICE) 16 and two or more MGUs, such as a first MGU (MGA 18), and a second MGU (MGB 20). The drivetrain system 14 includes a flexplate or flywheel 27, an electrically continuous variable transmission (EVT) 32, a driveshaft 34, a differential 36, axle shafts 38, brakes 40 and driven wheels 42. The drivetrain system 14 may include a damping device 41 between the flywheel 27 and the EVT 32. The powertrain system 12 includes a torque control module 43 that control torque of the EVT 32 to minimize vehicle jerk when switching from the EV mode to the hybrid mode. Although the powertrain system 10 is illustrated as a hybrid and rear wheel drive (RWD) powertrain, it is appreciated that the embodiments of the present disclosure can be implemented with other hybrid powertrain configurations.

The propulsion system 12 further includes a control system 70 that includes an engine control module (ECM) 50, a hybrid control module (HCM) 52 (may be referred to as a hybrid control processor (HCP)), and a transmission control module (TCM) 54. The control modules 50, 52 and 54 may be integrally formed into a single control module or may be distinct control modules, as shown. The control modules 50, 52, 54 share information with each other over a network 56, such as a CAN bus. For example only, the ECM 50 monitors and controls operation of the engine 16. The HCM 52 monitors and controls operation of the MGA 18 and the MGB 20. The TCM 54 monitors and controls operation of the EVT 32.

The control system 70 may regulate torque output of the engine 16, the MGA 18 and the MGB 20. The ECM 50 may determine, for example, engine speed (average and/or mean engine speed), engine position (crankshaft and/or camshaft position) based on information from various engine speed sensors 72. The ECM 50 may also determine derivatives of engine position and engine speed to obtain acceleration (and/ or deceleration) of the engine 16. The engine speed sensors 72 may include crankshaft and/or camshaft position sensors, crankshaft and/or camshaft speed sensors, etc. The information obtained and/or derived from the engine speed sensors 72 may be provided directly to the control modules 50, 52, 54. In one embodiment, the engine speed signals are provided to the ECM 50. The engine speed signals may be considered raw engine speed signals until signal conditioned by the ECM 50 or other signal conditioning circuitry.

The ECM 50, the HCM 52 and/or the TCM 54 control powertrain output torque. The HCM 52 can include one or more sub-modules including, but not limited to, the torque control module 43. A driver input 76 communicates with the ECM 50 and may communicate with the HCM 52. The driver input 76 can include, but is not limited to, an accelerator pedal and/or a cruise control system input. A driver interface 78 communicates with the TCM 54. The driver interface 78 includes, but is not limited to, a transmission range selector (e.g., a PRNDL lever). The control modules 50, 52, 54 may communicate with memory 80, which includes the engine model information. Information that is generated by each of the modules 50, 52, 54 may be directly transmitted between the modules 50, 52, 54 or stored in the memory 80 for access by each of the modules 50, 52, 54.

The ECM 50 may further monitor deviation in, for example, an expected output torque of the engine 16 or deviation from a minimum spark for best torque (MBT). Determining, monitoring and receiving of engine speeds, engine accelerations, and propulsion torques may be used to control operations, such as throttle position, spark and fuel timing, and fuel quantities of the engine 16.

The HCM 52 may estimate, for example, engine output torque based on an engine model, which may include the engine speed and the engine position information. Portions or all of the engine model information: may be provided to the HCM 52 from the ECM 50, stored in memory 80 and accessed by the HCM 52, and/or monitored, determined, and/or estimated by the HCM 52. The HCM 52 includes the torque control module 43, which controls output torque of the MGA 18 and the MGB 20 based on the engine model information.

Figure 3:
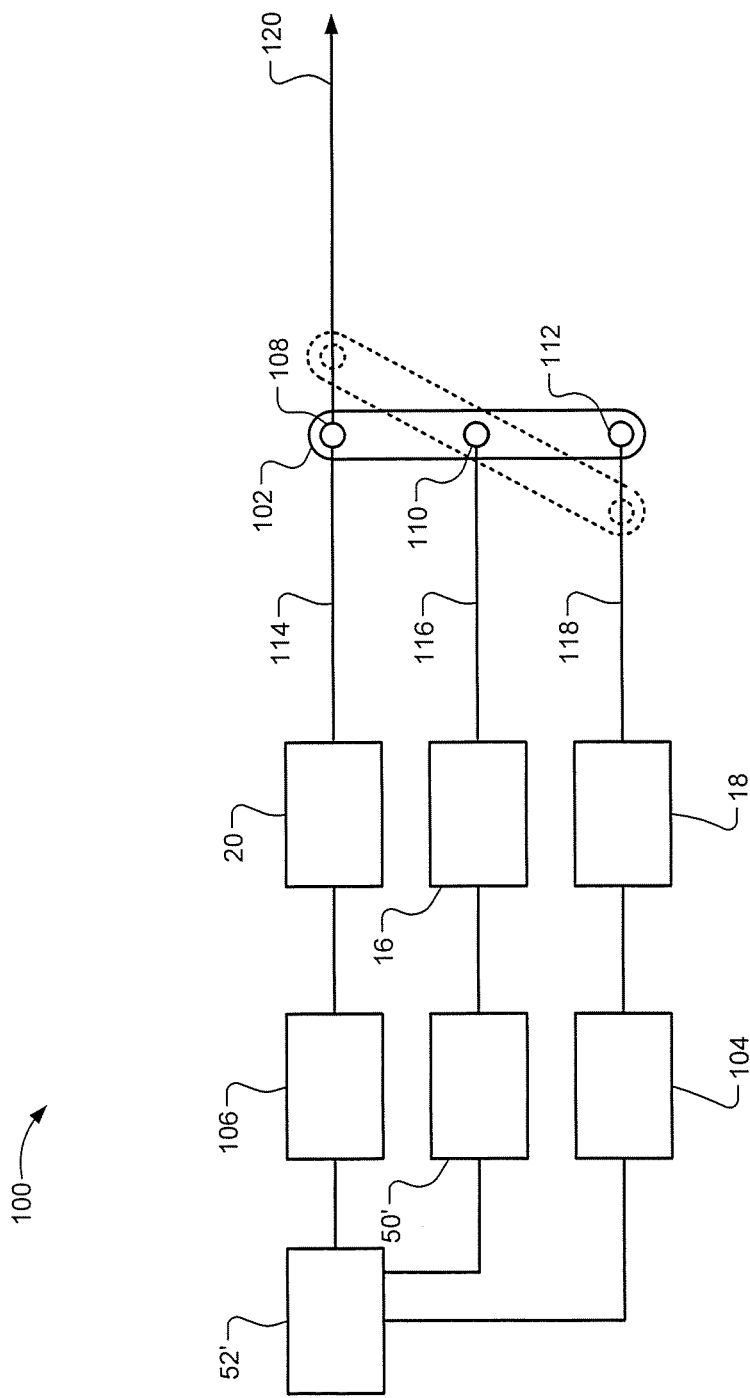
FIG. 3 is a functional block and lever diagram of a powertrain control system with a single planetary gear set in accordance with the present disclosure.
Figure 4:
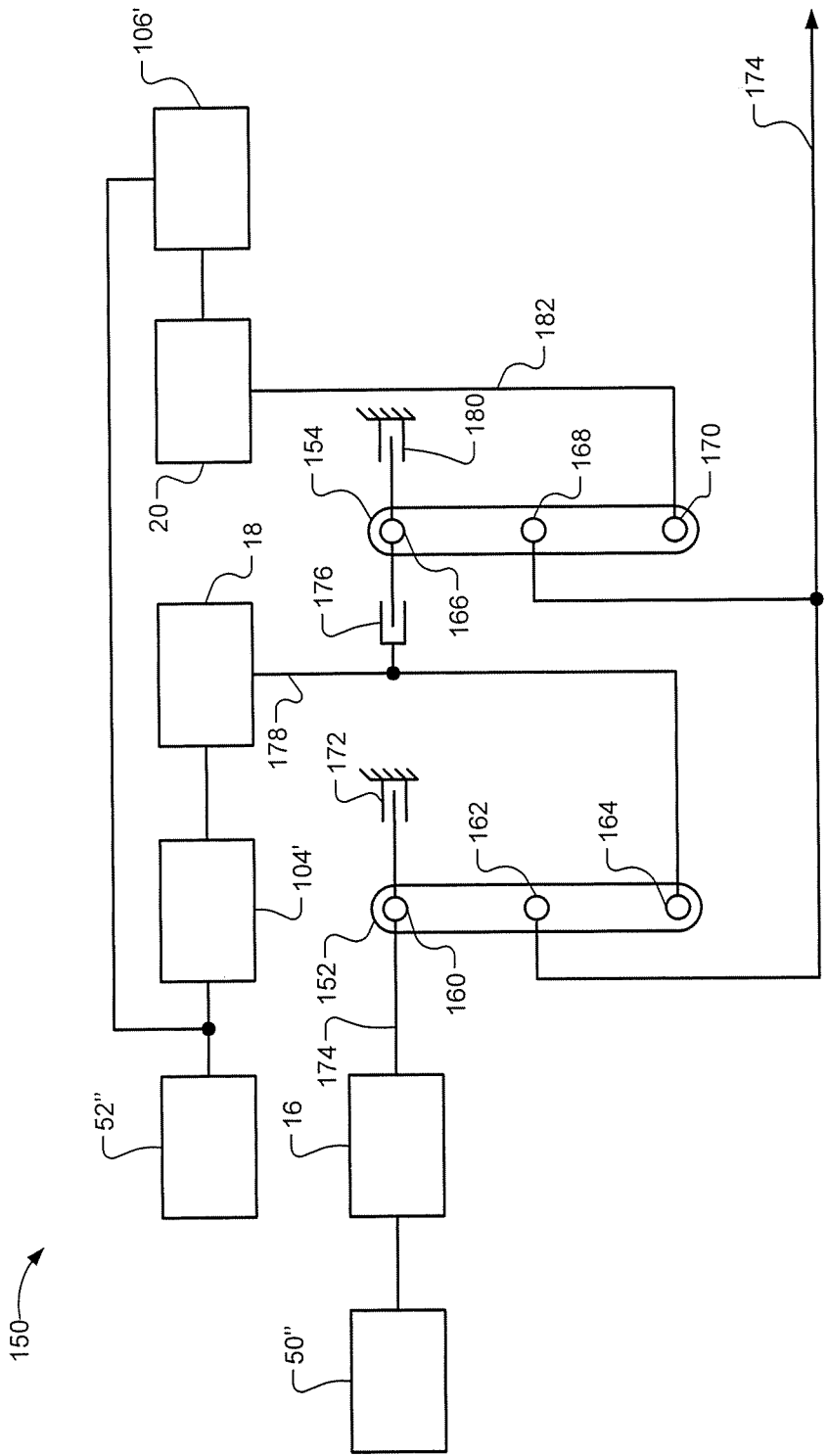
FIG. 4 is a functional block and lever diagram of another powertrain control system with multiple planetary gear sets in accordance with the present disclosure.

In use, the engine 16, the MGA 18, and the MGB 20 provide torque to gears of planetary gear sets 82 of the EVT 32. The EVT 32 may include any number of planetary gear sets. Example planetary gear sets are shown in FIGS. 3 and 4. The engine 16, the MGA 18 and the MGB 20 may individually at respective periods or concurrently during the same period provide output torque to the EVT 32. Each of the engine 16, the MGA 18 and the MGB 20 may include respective output shafts 84, 86, 88 that are connected to respective gears of the planetary gear sets 82. The output shaft of the engine 16 may be a crankshaft or connected to a crankshaft. The output shaft is connected to the damping device 41.

The MGA 18 and the MGB 20 receive power from and/or provide power to an energy storage system (ESS) 90. The ESS 90 may include batteries and/or battery packs. The HEV may be propelled using torque from one or more of the MGA 18 and the MGB 20 without torque from the engine 16 (EV mode). For this reason, the hybrid powertrain system 10 may be referred to as a strong hybrid powertrain system. The hybrid powertrain system 10 may operate in the EV mode upon initial startup of the HEV. For example only, the hybrid powertrain system 10 may remain in the EV mode until either power storage level(s) of the ESS 90 are less than predetermined power threshold(s) and/or torque request(s) are greater than predetermined torque thresholds. The hybrid powertrain system 10 may switch from EV mode to hybrid mode when speed or torque or battery SOC of the HEV is greater than a predetermined speed or torque or battery SOC threshold.

The hybrid powertrain system 10 may remain in EV mode for high vehicle speed operation (e.g., vehicle speeds greater than 40 mph). The high vehicle speeds may be provided by, for example, operating one of the MGA 18 and the MGB 20 at or within a predetermined range of a corresponding output torque limit. In one embodiment, the MGB 20 is used to provide torque during the EV mode and during a switch from the EV mode to the hybrid mode. The MGA 18 may be used to start the engine 16 during a transition from the EV mode to the hybrid mode.

The engine 16 may be started when the HEV is started and/or started when the HEV is switched from the EV mode to the hybrid mode. The engine 16 may be started to provide the propulsion torque of the HEV and/or to supplement the propulsion torque of the HEV provided by the MGA 18 and/or the MGB 20.

The hybrid powertrain system 10 may provide various fuel saving features, e.g., regenerative braking and automatic "start-stop" of the engine. Regenerative braking allows for selective recharging of the ESS 90 using the MGA 18 and/or the MGB 20. The capability of an HEV to selectively shut off and restart the engine 16 provides a fuel-saving benefit relative to conventional vehicle designs.

In operation, propulsion torque from the engine 16, the MGA 18 and/or the MOB 20 is transferred through the drivetrain system components to provide an axle torque $T_{AXLE}$ at the axle shafts 38 to drive the wheels 42. More specifically, the propulsion torque is multiplied by several gear ratios provided by the EVT 32 and the differential 36 to provide the axle torque $T_{AXLE}$. The gear ratios may be provided by the planetary gear sets 82 and a final drive gear set 98 connected to the EVT 32. The final drive gear set 98 is connected between the planetary gear sets 82 and the driveshaft 34.

Essentially, propulsion torque provided by the engine 16, the MGA 18 and the MGB 20 is multiplied by an effective gear ratio, which is a function of a ratio introduced by the EVT 32 and the differential 36, as well as any other component that may introduce a ratio in the drivetrain system 14 (e.g., a transfer case in a four wheel drive (4WD) or all wheel drive (AWD) powertrain).

Referring now also to FIG. 3, a functional block and lever diagram of a powertrain control system 100 with a single planetary gear set 102 is shown. The powertrain control system 100 includes the engine 16, the MGA 18, the MGB 20, an ECM 50' and a HCM 52'. The powertrain system 100 may also include torque control modules $TCM_A$ 104 and $TCM_B$ 106 for torque output control of the MGA 18 and the MGB 20. The torque control modules $TCM_A$ 104 and $TCM_B$ 106 may be part of the HCM 52' or may be separate modules as shown.

The planetary gear set 102 includes a first gear 108 (e.g. ring gear), a second gear 110 (e.g. planetary carrier gear), and a third gear 112 (e.g. sun gear). The MGB 20, the engine 16, and the MGA 18 may be connected respectively to any one of the first, second and third gears 108-112. In one embodiment, the MGB 20 is connected to the first gear 108 via a MGB output member 114. The engine 16 is connected to the second gear 110 via an engine output member 116. The MGA 18 is connected to the third gear 112 via a MGA output member 118. The output members 114-118 may be shafts of the engine 16, the MGA 18, and the MGB 20 or connected to the shafts of the engine 16, the MGA 18, and the MGB 20. In this embodiment, output torque of the planetary gear set 102 is obtained from the first gear 108, as shown by an output member 120 that is connected to the first gear 108. Torque of the output member 120 is directly related to torque applied to the first gear 108 or torque output of the MGB 20 during the EV mode.

Use of the planetary gear set 102 allows for variable speed adjustment of the engine 16 for a particular vehicle speed. For example, at a particular vehicle speed, speed of the engine 16 may be increased or decreased by adjusting speed(s) of one or both of the MGA 18 and the MGB 20. As an example, speed of the engine 16 may be increased or decreased by adjusting speed of the MGB 20 while maintaining speed of the MGA 18. For example, in the EV mode, the speed of the engine 16 may be maintained at approximately 0 rpm. Speed of the MGA 18 is adjusted relative to the speed of the MGB 20 to maintain 0 rpm. Speeds of the MGA 18 and the MGB 20 are adjusted in an inverse relationship. This inverse relationship is illustrated by example lever states shown in FIG. 3.

The planetary gear set 82 is shown in a first lever state and in a second lever state. For the example shown, the planetary gear set 82 is adjusted from the first lever state to the second lever state. Speed of the engine 16 is maintained at a constant speed by increasing MGB speed and decreasing MGA speed. This allows for increased torque output without an increase in engine speed.

Note that shafts of the MGA 18 and the MGB 20 are able to rotate in forward and reverse directions unlike the crankshaft of the engine 16. Thus, an increase or a decrease in speed of the MGA 18 or the MGB 20 may or may not increase magnitude speed of the other one of the MGA 18 and the MGB 20. For example, magnitude of the speed of the MGA 18 may increase or decrease when speed of the MGA 18 is decreased from the first lever state to the second lever state. The increase or decrease in magnitude depends upon the speed of the MGA 18 when in the first lever state. If the speed of the MGA 18 is 0 rpm than magnitude speed of the MGA 18 negatively increases. If the speed of the MGA 18 is greater than 0 rpm than the magnitude speed of the MGA 18 may decrease as speed of the MGA 18 is reduced to 0 rpm. Note that speed of the engine 16 may also be adjusted by both increasing speed of the MGA 18 and the MGB 20 or by decreasing speeds of both the MGA 18 and the MGB 20.

Referring now also to FIG. 4, a functional block and lever diagram of another powertrain control system 150 with multiple planetary gear sets 152, 154 is shown. The powertrain control system 150 includes the engine 16, the MGA 18, the MGB 20, an ECM 50", and a HCM 52". The powertrain control system 150 also includes torque control modules $TCM_A'$ 104', $TCM_B'$ 106' for the MGA 18 and the MGB 20 and first and second planetary gear sets 152, 154.

The first planetary gear set 152 includes a first gear 160 (e.g., ring gear), a second gear 162 (e.g. planetary carrier gear), and a third gear 164 (e.g., sun gear). The second planetary gear set 154 includes a fourth gear 166 (e.g., ring gear), a fifth gear 168 (e.g., planetary carrier gear), and a sixth gear 170 (e.g., sun gear). The first gear 160 is connected to a first clutch 172 and to the engine 16 via an engine output member 174. The first clutch 172 is grounded. The second gear 162 is connected to a gear set output member 175 which provides output torque of the planetary gear sets 152, 154 to, for example, a final drive gear set (e.g., the final drive gear set 98).

The third gear 164 is connected to a second clutch 176 and to the MGA 18 via a MGA output member 178. The fourth gear 166 is connected to the second clutch 176 and to a third clutch 180. The third clutch 180 is grounded. The fifth gear 168 is connected to the gear set output member 175. The sixth gear 170 is connected to the MGB 20 via a MGB output member 182.

Figure 5:
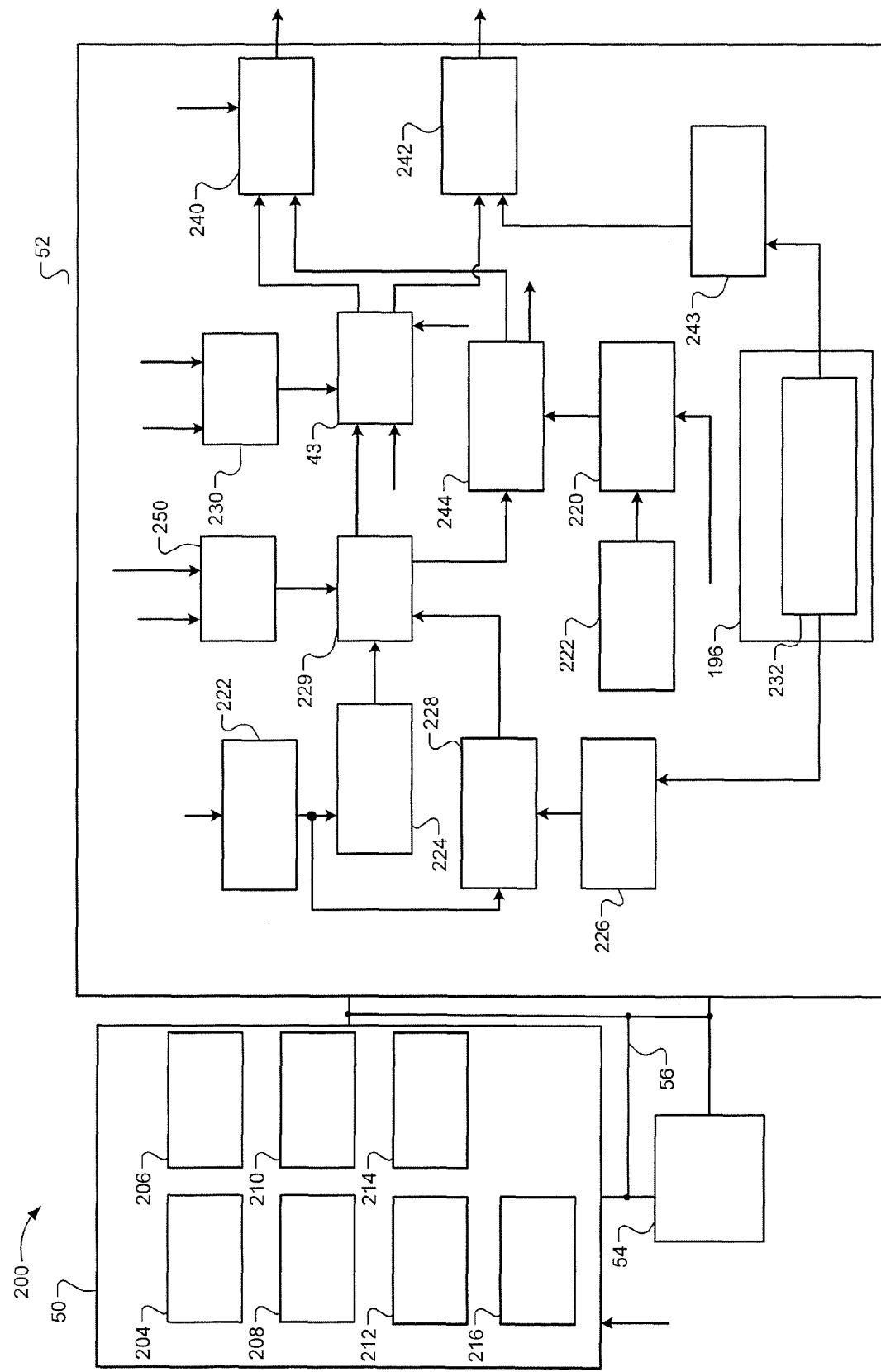
FIG. 5 is a functional block diagram of a hybrid control system in accordance with the present disclosure.

Referring now also to FIG. 5, a functional block diagram of a control system 200, such as one of the control systems of FIG. 2-4. The control system 200 includes, for example, the ECM 50, the HCM 52 and the TCM 54. The ECM 50, the HCM 53 and the TCM 54 may be distinct modules and include respective transceivers for communicating directly with each other and/or over the network 56. The ECM 50, the HCM 52 and the TCM 54 may be connected to the network 56 and communicate via wired connections. As an alternative, the ECM 50, the HCM 52 and the TCM 54 may communicate wirelessly with each other.

The ECM 50 includes an engine speed module 204, an engine acceleration module 206, a spark control module 208, a throttle control module 210, a fuel control module 212, a propulsion torque module 214, and may include other modules 216, such as a cruise control module, a cylinder deactivation module, a diagnostic module, etc. The modules 208-214 may be referred to as parameter control modules. The engine speed module 204 may determine the mean engine speed of the engine 16 based on engine speed signals and/or other parameters described herein.

The control modules 208-214 control respectively spark timing, throttle position, fuel timing and quantities, and propulsion torque or output torque of the engine 16 based on various parameters. Example parameters are engine speed, coolant and oil temperatures, barometric pressures, etc.

The HCM 52 includes the torque control module 43 that is used to control output torque of the MGA 18 and the MGB 20. The HCM 52 also includes a mode selection module 220, a MGB torque limit module 222, a transmission output torque module 224, a peak pulse cancellation module 226, a MGB torque comparison module 228, and a torque override module 229.

The torque control module 43 adjusts torque output of the MGA 18, the MGB 20 based on a torque request signal $T_{REQ}$ from a torque request module 229. The torque request module 229 generates the torque request signal $T_{REQ}$ based on, for example, a pedal signal PEDAL (driver torque request signal) and other torque request signals $T_{Other}$. The pedal signal PEDAL may be from an accelerator pedal sensor. The other torque request signals $T_{Other}$ may include air conditioning torque requests, cruise control torque requests, etc.

The mode selection module 220 determines operating mode of the control system 200, such as whether to operate in the EV mode or in the hybrid mode, and generates a mode selection signal MODE. Any of the modules of the HCM 52 may operate based on the mode selection signal MODE. The mode selection module 220 selects one of the EV mode and the hybrid mode based on the torque request signal $T_{REQ}$ and an ESS status signal from an ESS status module 222. The mode section module 220 may also select the operating mode based on current operating state of the MGA 18 and the MGB 20. The torque control module 43 may generate and provide MGA and MGB status signals to the mode selection module 220. The mode selection module 220 may also select an engine startup mode, which may be an initial portion of the hybrid mode. The MGB torque limit module 223 determines a torque output limit $T_{MGBLim}$ of the MGB 20 based on a current MGB speed and/or speed Vspd of the HEV.

Figure 6:
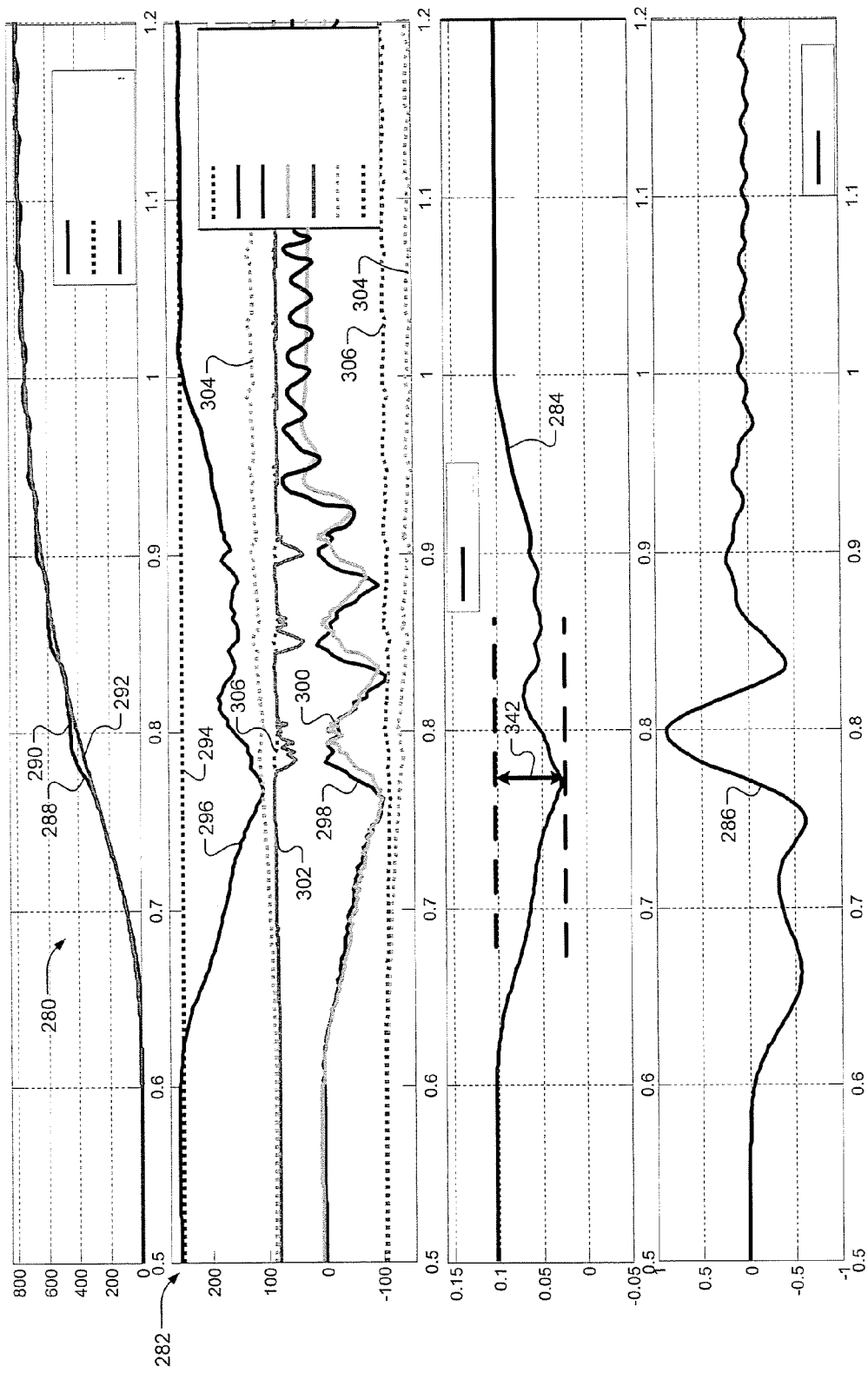
FIG. 6 is a set of plots illustrating vehicle jerk without torque control method provided in accordance with the present disclosure.
Figure 7:
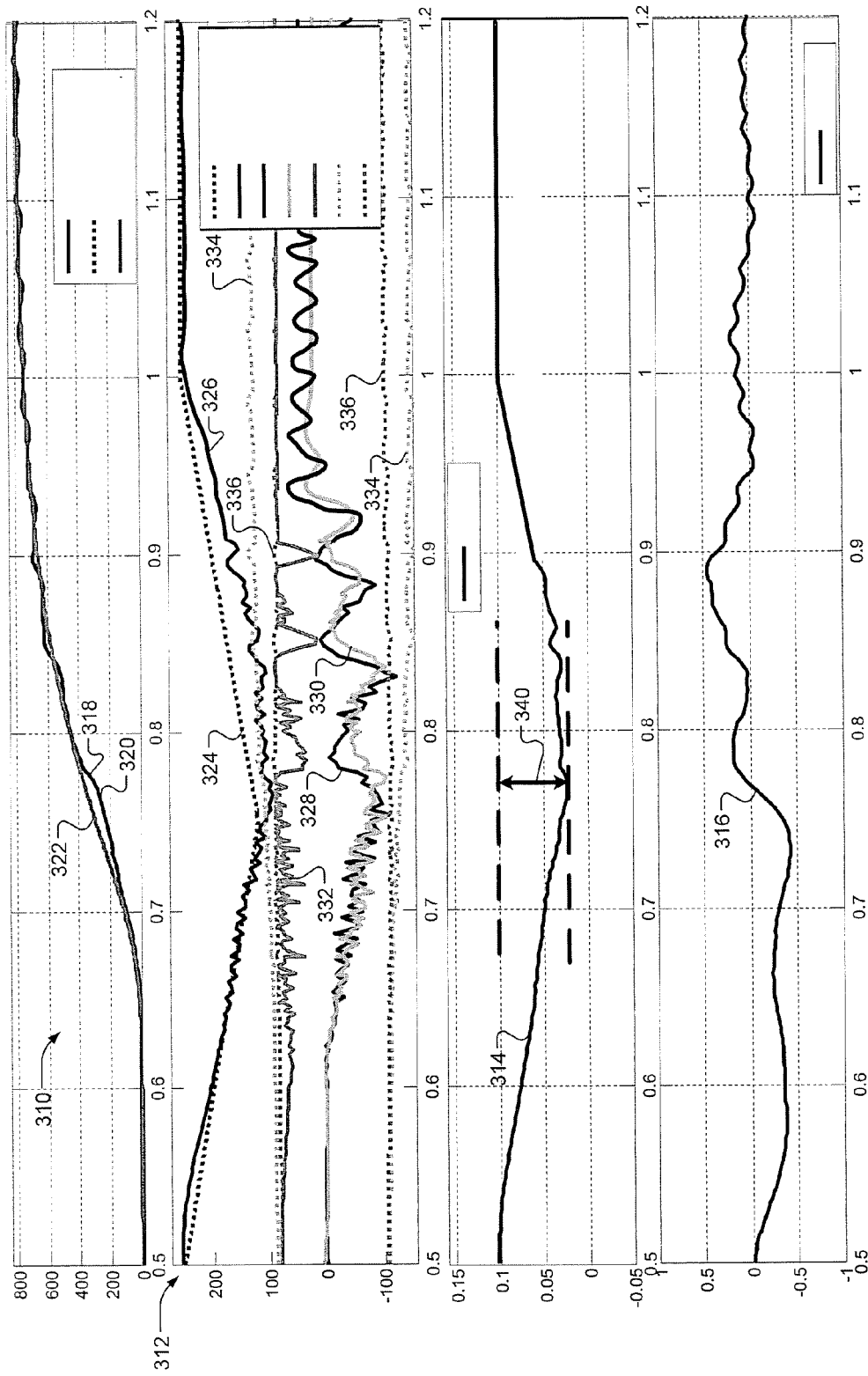
FIG. 7 is a set of plots illustrating vehicle jerk with proposed torque control method provided in accordance with the present disclosure.

The transmission output torque module 224 determines a maximum transmission output torque (maximum torque output from planetary gear sets of the transmission) $T_{MAX}$ when engine peak torque $T_{ENGPEAK}$ occurs during engine startup. Examples of engine peak torque during engine startup are shown in FIGS. 6 and 7. The engine 16 is cranked during startup using torque output from the MGA 18. The engine peak torque $T_{ENGPEAK}$ during startup may refer to a first compression stroke during cranking. The maximum transmission output torque may be determined for a current MGB operating speed.

The peak pulse cancellation module 226 determines a MGB torque output to cancel the engine peak torque $T_{ENGPEAK}$ generated during engine startup. The MGB torque output may be determined based on information from an engine modeling module 230, such as the engine peak torque $T_{ENGPEAK}$ and/or speed Vspd of the HEV. The engine modeling module 230 may include, for example, an engine torque estimation module 232. The engine torque estimation module 232 estimates output torque of the engine 16 based on engine modeling information, such as engine position and speed as described above.

The peak pulse cancellation module 226 generates a MGB torque cancellation signal $T_{MGBCANC}$. The MGB torque cancellation signal $T_{MGBCANC}$ indicates a magnitude of MGB output torque that cancels the engine peak torque $T_{ENGPEAK}$ when generated 180° out-of-phase from the engine peak torque $T_{ENGPEAK}$. This helps to minimize vehicle jerk during startup.

The MGB 20 may not be able to generate the MGB torque output needed to cancel the engine peak torque (engine cancellation torque) $T_{ENGPEAK}$. For example, when the MGB 20 is operating at or within a predetermined range of the MGB torque output limit $T_{MGBLim}$, the torque output of the MOB 20 may not be further increased to provide enough engine cancellation torque. The MGB torque comparison module 228 determines whether the MGB 20 is able to provide enough engine cancellation torque.

The MGB torque comparison module 228 compares the MGB torque output limit $T_{MGBLim}$ with the MGB torque cancellation signal $T_{MGBCANC}$. The MGB torque comparison module 228 generates an override activate signal OVRACT when the MGB torque cancellation signal $T_{MGBCANC}$ is greater than the MGB torque output limit $T_{MGBLim}$. The override activate signal OVRACT may be HIGH when the MGB torque cancellation signal $T_{MGBCANC}$ is greater than the MGB torque output limit $T_{MGBLim}$. The override activate signal OVRACT indicates to the torque control module 43 to operate in an override mode. The override mode includes the torque control module 43 deviating from following the torque request signal $T_{REQ}$. This is described in further detail below.

The torque control module 43 signals a MGA control module 240 and a MGB control module 242 based on output of the torque override module 229 and a pulse cancellation signal $P_{Canc}$ from an engine pulse cancellation module 243. The torque control module 43 may generate a MGA torque request signal $T_{MGAREQ}$ and a MGB torque request signal $T_{MGBREQ}$ based on: the torque request signal $T_{REQ}$; the mode selection signal MODE; an engine start signal $ENG_{START}$ from an engine start module 244; and/or a torque override request signal $T_{OVR}$ from the torque override module 229.

The engine start module 244 may generate the engine start signal $ENG_{START}$ based on the mode selection signal MODE and a timing signal TIME from the torque override module 229. The timing signal TIME may be used to enable starting of the engine 16. The engine start module 244 may generate an engine ignition signal ENGIGN indicating when to start ignition of the engine 16. The engine ignition signal ENGIGN may be generated when the engine 16 is cranked for a predetermined period, for a predetermined number of rotations of the crankshaft, etc. The ECM 50 may enable ignition (e.g. spark) based on the engine ignition signal ENGIGN.

The MGA control module 240 may control operation of the MGA 18 based on the mode selection signal MODE, the MGA torque request signal $T_{MGAREQ}$, and the engine start signal $ENG_{START}$. The MGB control module 242 controls operation of the MGB 20 based on the mode selection signal MODE, the MGB torque request signal $T_{MGBREQ}$, and the pulse cancellation signal $P_{Canc}$.

The torque control module 43 and/or the MGB control module 242 may include the engine pulse cancellation module 246 or the engine pulse cancellation module 246 may be distinct from the modules 43, 242, as shown. The engine pulse cancellation module 246 monitors engine output torque and/or velocity of the HEV and signals the MGB control module 242 to cancel the engine output torque during engine startup. The engine pulse cancellation module 246 determines engine output torque during startup, which is to be cancelled by torque output of the MGB 20 and generates the pulse cancellation signal $P_{Canc}$. The pulse cancellation signal $P_{Canc}$ may be generated based on information (e.g., engine output torque and vehicle speed) from the engine modeling module 230, and/or the engine torque estimation module 232.

The torque override module 229 generates the torque override request signal $T_{OVR}$ based on the torque request signal $T_{REQ}$ and the override activate signal OVRACT. The torque control module 43 may follow the torque override request signal $T_{OVR}$ instead of the torque request signal $T_{REQ}$ during engine startup when the override activate signal OVRACT is HIGH. As another example, the torque control module 43 may modify the torque request signal $T_{REQ}$ based on the torque override request signal $T_{OVR}$.

The profile of the torque override request signal $T_{OVR}$ may be selected by a profile selection module 250. The profile selection module 250 may select a different torque profile based on, for example, pedal position and operating mode.

In the following FIGS. 6 and 7, sets of example plots are shown for an HEV transitioning from an EV mode to a hybrid mode. The transition is performed while operating a MGU, such as the MGB 20 of FIG. 2-4, at or within a predetermined range of peak output torque levels (MGU output torque limits). Velocity of the HEV is greater than 0 mph when switching from the EV mode to the hybrid mode (referred to as a flying start).

In FIG. 6, a set of plots are shown which illustrate resulting vehicle jerk when torque control as disclosed herein is not used. The set of plots includes a speed set 280, a torque set 282, an acceleration plot 284 and a vehicle jerk plot 286. The speed set 280 includes an engine speed plot 288, a transmission input speed plot 290 and an input speed profile 292. The torque set 282 includes a transmission torque request signal 294 (e.g., transmission torque out of planetary gear sets of a transmission), a transmission torque achieved signal 296 (e.g., actual transmission torque out of the planetary gear sets), engine torque 298, MGA output torque 300, MGB output torque 302, MGA output torque limits 304, MGB output torque limits 306.

In FIG. 6, a switch from operating in the EV mode to the hybrid mode is initiated at about 0.6 seconds (s). Since an initial transmission output torque of the MGB 20 is operating at the MGB output torque limit, output torque of the MGB 20 can not be increased. In other words, the MGB output torque is saturated. MGA output torque is used to provide engine cranking torque and is not used to supplement the transmission output torque. As a result, the actual transmission output torque decreases during engine startup to time tx when the first peak engine torque occurs for a first engine cycle. The actual transmission output torque at time tx is identified as point X". The actual transmission output torque increases after time tx.

Speed and acceleration rates of the engine change during startup. This is shown by the acceleration and vehicle jerk plots 284, 286. For the example shown, peak vehicle jerk during engine startup is approximately 0.9 g/s, where g refers to acceleration due to gravity. By overriding the transmission output torque request to follow the torque override request signal $T_{OVR}$ described above: peak-to-peak acceleration may not be increased; acceleration may be smoothed (size and number of increases and decreases in acceleration minimized) during startup; and vehicle jerk may be reduced as shown in FIG. 7. For the example shown, ignition (spark) is activated between 0.9-1.0 s.

In FIG. 7, a set of plots are shown which illustrate resulting vehicle jerk when torque control as disclosed herein is used. The set of plots includes a speed set 310, a torque set 312, an acceleration plot 314 and a vehicle jerk plot 316. The speed set 310 includes an engine speed plot 318, a transmission input speed plot 320 and an input speed profile 322. The torque set 312 includes a transmission output torque request signal 324 (e.g., transmission torque out of planetary gear sets of a transmission), a transmission torque achieved signal 326 (e.g., actual transmission torque out of the planetary gear sets), engine torque 328, MGA output torque 330, MGB output torque 332, MGA output torque limits 334, MGB output torque limits 336.

In the example embodiment of FIG. 7, the transmission output torque request signal 324 is modified to follow the torque override request signal $T_{OVR}$ (e.g., profiles of FIGS. 6 and 7). As a result, the transmission output torque request signal 324 decreases linearly from an initial output torque request $T_{INIT}$ to the maximum transmission output torque $T_{MAX}$. The maximum transmission output torque $T_{MAX}$ is provided at the peak engine output torque time tx. The transmission output torque request signal 324 increases linearly after the peak engine output torque time tx. The transmission output torque request signal 324 may increase to the initial torque request $T_{INIT}$ or to an updated torque request. An initial torque request may refer to transmission torque requested before a switch between the EV and hybrid modes is initiated.

Peak-to-peak change in acceleration 340 as shown in FIG. 7 is not greater than peak-to-peak change in acceleration 342 as shown in FIG. 6. Vehicle jerk is decreased without an increase in peak-to-peak change in acceleration using the herein disclosed torque control. The acceleration provided using the described torque control is also smoothed compared to the acceleration when the torque control is not used. See plots 284 and 314. For the example shown, ignition (spark) is activated between 0.9-1.0 s.

Figure 8:
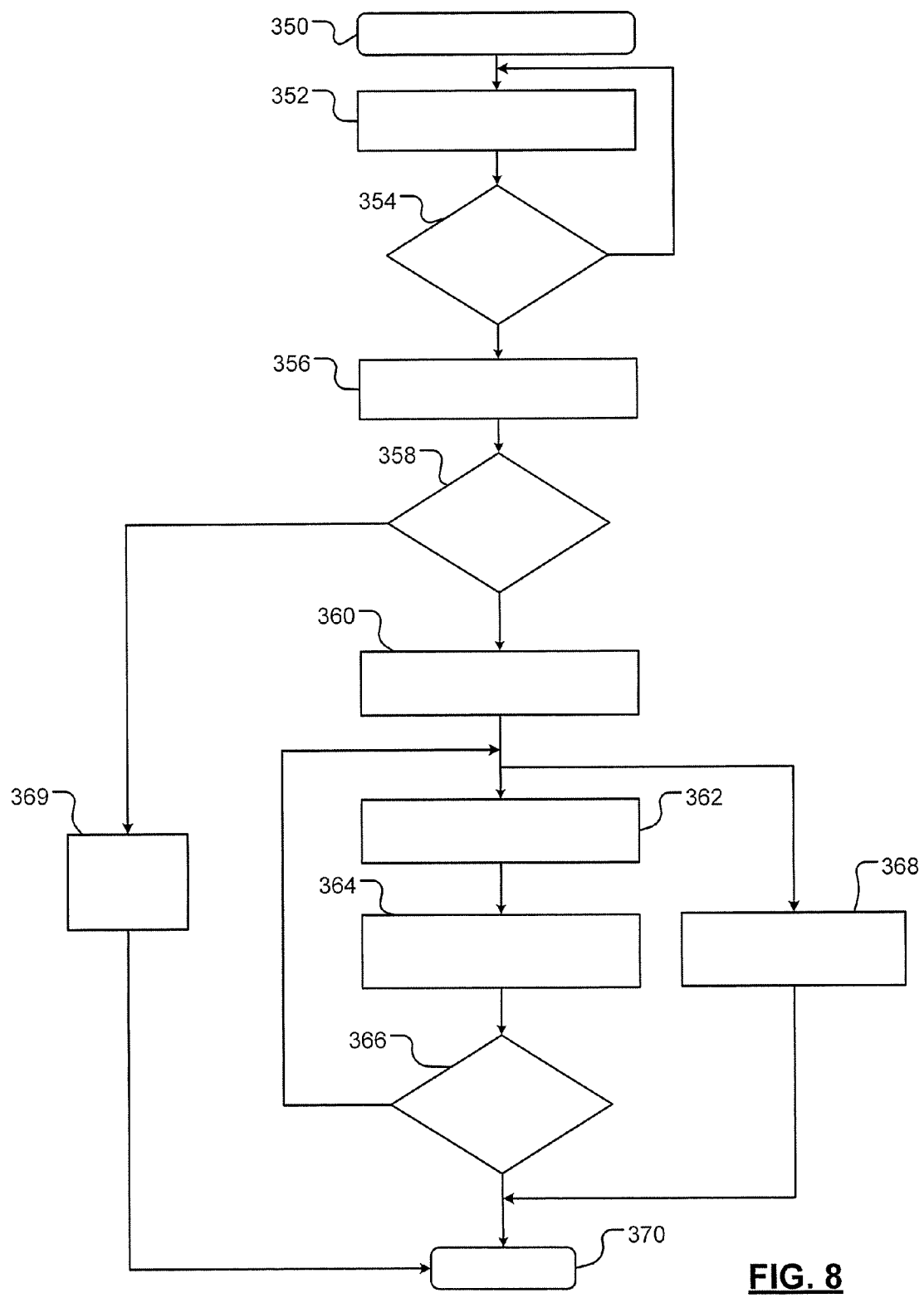
FIG. 8 is a logic flow diagram illustrating a method of controlling torque output of a transmission in accordance with the present disclosure.

In FIG. 8, a logic flow diagram illustrating a method of controlling torque output of a transmission is shown. Although the following tasks performed at 202-220 are described primarily with respect to the embodiments of FIGS. 2-4 and the example of FIG. 7, the tasks performed at 352-370 may be applied to other embodiments of the present disclosure.

The method may begin at 350. At 352, the HEV may operate in the EV mode. During the EV mode, a motor torque reserve for a MGU, such as the MGB 20 of FIGS. 2-4, is not maintained. Put another way, the MGB output torque is permitted to exceed a motor torque reserve limit and operate at or within a predetermined range of a MGB torque limit. At 354, the mode selection module may select the hybrid mode and initiate a switch from the EV mode to the hybrid mode to restart the engine 16 (flying start). The engine start module 244 may generate the engine start signal $ENG_{START}$ indicating startup of the engine 16. Task 356 is performed when the hybrid mode is selected, otherwise control returns to task 352.

At 356, the peak pulse cancellation module 226 estimates MGB output torque $T_{MGBCANC}$ to cancel a first peak and/or overall peak engine output torque generated during engine startup. The first peak refers to a first peak in magnitude in the engine output torque during a first engine cycle (without spark). The engine output torque oscillates and thus as multiple peak magnitudes (2 per oscillation). The overall peak engine output torque refers to the largest magnitude torque output during the engine startup overall multiple engine cycles (without spark).

At 358, the MGB torque comparison module 228 determines whether the MGB output torque $T_{MGBCANC}$ determined at 356 is greater than a MGB output torque limit $T_{MGBLIM}$. Task 360 is performed when the MGB output torque is greater than the MGB output torque limit $T_{MGBLIM}$, otherwise task 366 is performed.

At 360, the transmission output torque module 224 determines the maximum transmission output torque $T_{MAX}$ corresponding to when the peak engine output torque occurs during startup. Engine cranking is performed during tasks 362 and 364. After task 360, tasks 362 and 368 may be performed. At 362, the torque override module 229 generates the torque override request signal $T_{OVR}$ to modify or override the transmission torque request signal $T_{REQ}$. In the example of FIG. 7, the torque override request signal $T_{OVR}$ is generated at approximately 0.5 s. Engine startup is initiated at approximately 0.6 s with engine cranking using torque from the MGA 18. Since the transmission torque output is primarily provided by the MGB 20, the MGB torque request signal is also modified or overridden to follow the torque override request signal $T_{OVR}$. As a result, the MGB output torque and the transmission output torque decrease from approximately an initial torque request (e.g., transmission output torque request before engine startup) to the maximum transmission output torque request $T_{MAX}$.

At 364, the torque override module 229 continues to generate the torque override request signal $T_{OVR}$ to modify or override the transmission torque request signal $T_{REQ}$. The MGB output torque and the transmission output torque increase from approximately the maximum transmission output torque $T_{MAX}$ to the initial torque request $T_{INIT}$ or to an updated torque request. In the example of FIG. 9, ignition of the engine 16 is activated at approximately 0.9-1.0 s. The ignition may be activated after a predetermined number of engine cranks. Engine startup mode is completed when ignition is activated. As engine output torque increases with ignition activation, the transmission output torque begins to follow the transmission output torque request signal $T_{REQ}$ and not the torque override request signal $T_{OVR}$.

At 366, the torque control module 43 may determine whether engine startup is complete. Task 362 is performed when engine startup is not complete. At 368, engine pulse cancellation is performed as described above. The MGB output torque is adjusted and is 180° out-of-phase with the engine output torque. The transmission output torque $T_{OUT}$ is maintained at a constant level or is non-oscillating during startup. The engine output torque $T_{ENG}$ and MGB output torque $T_{MGB}$ are adjusted to maintain the transmission output torque $T_{OUT}$ at a constant level and/or to prevent the transmission output torque from oscillating. The transmission output torque $T_{OUT}$ may be determined, for example, using equation 1.

$$T_{OUT} = T_{ENG} + T_{MGB} \qquad (1)$$

An example of this is shown in FIG. 7. Task 366 may be performed while one or more of tasks 360-364 are performed. After task 366, the method may end at task 370.

At 369, the torque control module 43 follows the transmission output torque request while starting the engine 16 and operating in the hybrid mode. The transmission output torque request is not overridden or modified, as in tasks 360-364. After task 369, the method may end at 370.

The above-described tasks 352-370 are meant to be illustrative examples; the tasks 352-370 may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A hybrid control system for a hybrid electric vehicle (HEV), the hybrid control system comprising:
   a hybrid control module that comprises:
      a first motor control module that controls an output torque of a first motor;
      a second motor control module that controls an output torque of a second motor based on a second motor torque request signal, wherein the second motor torque request signal is generated based on a transmission torque request signal prior to startup of an engine of the HEV;
      an override module that generates a torque override request signal during the startup; and
      an output torque module that determines a transmission output torque based on a peak torque of the engine occurring during the startup of the engine,
   wherein the first motor control module controls the output torque of the first motor to crank the engine during the startup, and
   wherein the second motor control module adjusts the output torque of the second motor based on the torque override request signal and not the transmission torque request signal during the startup, and
   wherein the second motor control module, while the engine is being cranked, (i) decreases the output torque of the second motor from a level of the transmission torque request signal to the transmission output torque, and then (ii) increases the output torque of the second motor from the transmission output torque to the level of the transmission torque request signal.

2. The hybrid control system of claim 1, wherein the second motor control module operates the second motor within a predetermined range of an output torque limit of the second motor during the startup.

3. The hybrid control system of claim 1, wherein the second motor control module signals the second motor to generate an output torque that is equal to an output torque limit of the second motor prior to the startup.

4. The hybrid control system of claim 1, wherein the first motor control module signals the first motor to generate cranking torque to crank the engine during the startup when transitioning from an electric vehicle mode to a hybrid vehicle mode.

5. The hybrid control system of claim 1, wherein a velocity of the HEV is greater than 0 miles-per-hour during startup.

6. The hybrid control system of claim 1, wherein torque of the torque override signal is less than torque of the transmission torque request signal.

7. The hybrid control system of claim 1, wherein the override module decreases torque of the override request signal from a level of the transmission torque request signal to a first maximum compression torque of the engine during the startup.

8. The hybrid control system of claim 1, further comprising at least one planetary gear set comprising:
   a first planetary gear connected to the first motor;
   a second planetary gear connected to the second motor; and
   a third planetary gear connected to the engine.

9. The hybrid control system of claim 1, wherein:
   the first motor is connected to a first planetary gear of a transmission;
   the second motor is connected to a second planetary gear of the transmission; and
   the engine is connected to a third planetary gear of the transmission.

10. The hybrid control system of claim 1, wherein the hybrid control module further comprises:
    a mode selection module that generates a mode selection signal based on selection between an electric vehicle mode and a hybrid mode; and
    an engine start module that signals the first motor control module to generate cranking torque based on the mode selection signal.

11. The hybrid control system of claim 10, wherein the hybrid control module further comprises a torque control module that signals the first motor control module to supplement output torque of the second motor control module to provide a transmission output torque of the transmission torque request signal when in the electric vehicle mode.

12. The hybrid control system of claim 1, wherein the hybrid control module further comprises:
    an engine modeling module that estimates an engine output torque of the engine;
    a peak pulse cancellation module that determines a peak engine torque during the startup based on the engine output torque; and
    a torque comparison module that generates an override activation signal based on the peak engine torque,
    wherein the override module generates the torque override request signal based on the override activation signal to cancel at least a portion of the engine output torque during the startup.

13. The hybrid control system of claim 1, wherein the hybrid control module further comprises:
    a mode selection module configured to select an electric vehicle mode and a hybrid mode, wherein the mode selection module selects one of the electric vehicle mode and the hybrid mode based on a status signal and generates a mode selection signal;
    an engine start module that generates an engine ignition signal based on the mode selection signal; and
    an engine control module that controls an output torque of the engine based on the engine ignition signal.

14. The hybrid control system of claim 13, wherein the status signal is one of a storage system status signal and a motor status signal.

15. The hybrid control system of claim 1, wherein:
    the hybrid control module operates in one of an electric vehicle mode and a hybrid mode;
    the second motor control module signals the second motor to operate at an output torque limit during the electric vehicle mode to provide torque of the transmission torque request signal; and
    the second motor control module reduces the output torque of the second motor to less than the output torque limit based on the torque override request signal and during the startup.

16. The hybrid control system of claim 1, wherein the hybrid control module further comprises:
- an engine modeling module that determines an output torque of the engine and generates a torque estimation signal, and
- a pulse cancellation module that generates a pulse cancellation signal based on the torque estimation signal and velocity of the HEV,
- wherein the second motor control module signals the second motor to generate a second output torque that is out-of-phase with the output torque of the engine based on the pulse cancellation signal, and
- wherein the second output torque cancels at least a portion of the output torque of the engine.

17. The hybrid control system of claim 1, wherein the hybrid control module further comprises a profile module that selects a profile of the torque override request signal,
- wherein the profile comprises a first linear portion with a negative slope and a second linear portion with a positive slope, and
- wherein torque output of the second motor is generated based on the first linear portion prior to being based on the second linear portion during the startup.

18. A hybrid control system for a hybrid electric vehicle (HEV), the hybrid control system comprising:
- a hybrid control module that comprises:
- a first motor control module that controls an output torque of a first motor;
- a second motor control module that controls an output torque of a second motor based on a second motor torque request signal, wherein the second motor torque request signal is generated based on a transmission torque request signal prior to startup of an engine of the HEV;
- an override module that generates a torque override request signal during the startup;
- a torque control module that adjusts the transmission torque request signal based on the torque override request signal,
- wherein the first motor control module controls the output torque of the first motor to crank the engine during the startup, and
- wherein the second motor control module cancels output torque of the engine including adjusting the output torque of the second motor based on the adjusted transmission torque request signal during the startup;
- a peak pulse cancellation module that determines a peak torque of the engine during the startup; and
- a torque comparison module that generates an override activation signal based on the peak torque,
- wherein the override module generates the torque override request signal based on the override activation signal.

19. The hybrid control system of claim 18, wherein the hybrid control module further comprises:
- a mode selection module that transitions from an electric vehicle mode to a hybrid mode and generates a mode selection signal; and
- an engine start module that signals the first motor control module to generate cranking torque based on the mode selection signal,
- wherein the torque control module signals the second motor control module to generate an output torque that is equal to the torque override request signal based on the mode selection signal.

20. The hybrid control system of claim 18, wherein:
- the second motor control module signals the second motor to generate an output torque that is equal to an output torque limit of the second motor prior to the startup; and
- the second motor control module operates the second motor within a predetermined range of the output torque limit of the second motor during the startup.

21. The hybrid control system of claim 1, wherein the second motor control module does not control the output torque of the second motor to crank the engine during the startup.

* * * * *